March 20, 1962 J. B. COOK 3,025,656

METHOD AND APPARATUS FOR MAKING COMMUNICATION CABLE

Filed July 17, 1957 5 Sheets-Sheet 1

Inventor:
John Brown Cook
By Zabel, Baker, York, Jones & Dithmar
Attorneys

March 20, 1962 J. B. COOK 3,025,656

METHOD AND APPARATUS FOR MAKING COMMUNICATION CABLE

Filed July 17, 1957 5 Sheets-Sheet 2

Inventor:
John Brown Cook
By: Zabel, Baker, York, Jones & Dithmar
Attorneys:

Inventor:
John Brown Cook
By: Zabel, Baker, York, Jones & Dithmar
Attorneys

March 20, 1962 J. B. COOK 3,025,656

METHOD AND APPARATUS FOR MAKING COMMUNICATION CABLE

Filed July 17, 1957 5 Sheets-Sheet 4

Inventor:
John Brown Cook
By: Zabel, Baker, York, Jones & Dithmar
Attorneys

March 20, 1962 J. B. COOK 3,025,656

METHOD AND APPARATUS FOR MAKING COMMUNICATION CABLE

Filed July 17, 1957 5 Sheets-Sheet 5

Inventor:
John Brown Cook
By: Zabel, Baker, York, Jones & Dithmar
Attorneys

United States Patent Office 3,025,656
Patented Mar. 20, 1962

3,025,656

METHOD AND APPARATUS FOR MAKING COMMUNICATION CABLE

John Brown Cook, North Haven, Conn., assignor, by mesne assignments, to The Cook Foundation, Incorporated, Hamden, Conn., a corporation of Connecticut
Filed July 17, 1957, Ser. No. 672,449
19 Claims. (Cl. 57—34)

This invention relates to an improved method and apparatus for making communication cable.

In the manufacture of cables for the communication industry, such as telephone cables, the individual wire pairs or other conductor groups are twisted with different pitches in order to eliminate interference or cross-talk between adjacent pairs. As an example, in the usual telephone cable all of the wire pairs will bave a right-hand twist but it will be found that as many as twelve different pitches are used.

It is an object of the present invention to provide an improved cable in which the pitch of the several wire pairs or conductor units will vary from point to point along its length and in such a manner that the pitch of one wire pair at a given point will differ from the pitch of an adjacent wire pair at that given point to the end that interference between individual wire pairs can be eliminated.

Another object is to provide an improved type of zigzag twist for conductor units or for cable units, or for both.

Another object is to provide an improved communication cable which lends itself to a simpler type of fabrication than the present cables.

The usual practice is to wind up a supply of wire pairs having a given twist, and then another supply having a different twist, and the separate types of wire pairs are stored on reels. Then in fabricating the cable, these reels, each one representing a different pitch, are mounted on the cabling machine. In other words, the manufacture of a cable must take place in two different stages, one for imparting the desired twist to the wire pair, and the second stage for twisting together the several wire pairs into a cable unit, or cable. When the cable comprises two or more units, then a third stage is necessary for twisting the units together.

According to the present invention, I impart a zigzag twist to the wire pairs, which is to say it will be a right-hand twist for a certain number of inches, and then a left-hand twist. In order to avoid cross-talk, the initial twisting is done in such a manner that the pitch will vary from one wire pair to the other.

It is a further object of the present invention to provide method and apparatus for imparting a zigzag twist to a plurality of wire pairs at the same time, and in such a manner that the cabling operation can be accomplished simultaneously with the initial twisting operation.

Another object of my invention is to provide a method and apparatus for cabling wire pairs which does not impose any substantial tension upon the wires. Therefore, it is possible to use much finer wire than is now customarily used, such as sizes Nos. 28 and 30.

With reference now to the drawings, in which like reference numerals designate like parts:

Figures 9, 10, 11, 12:
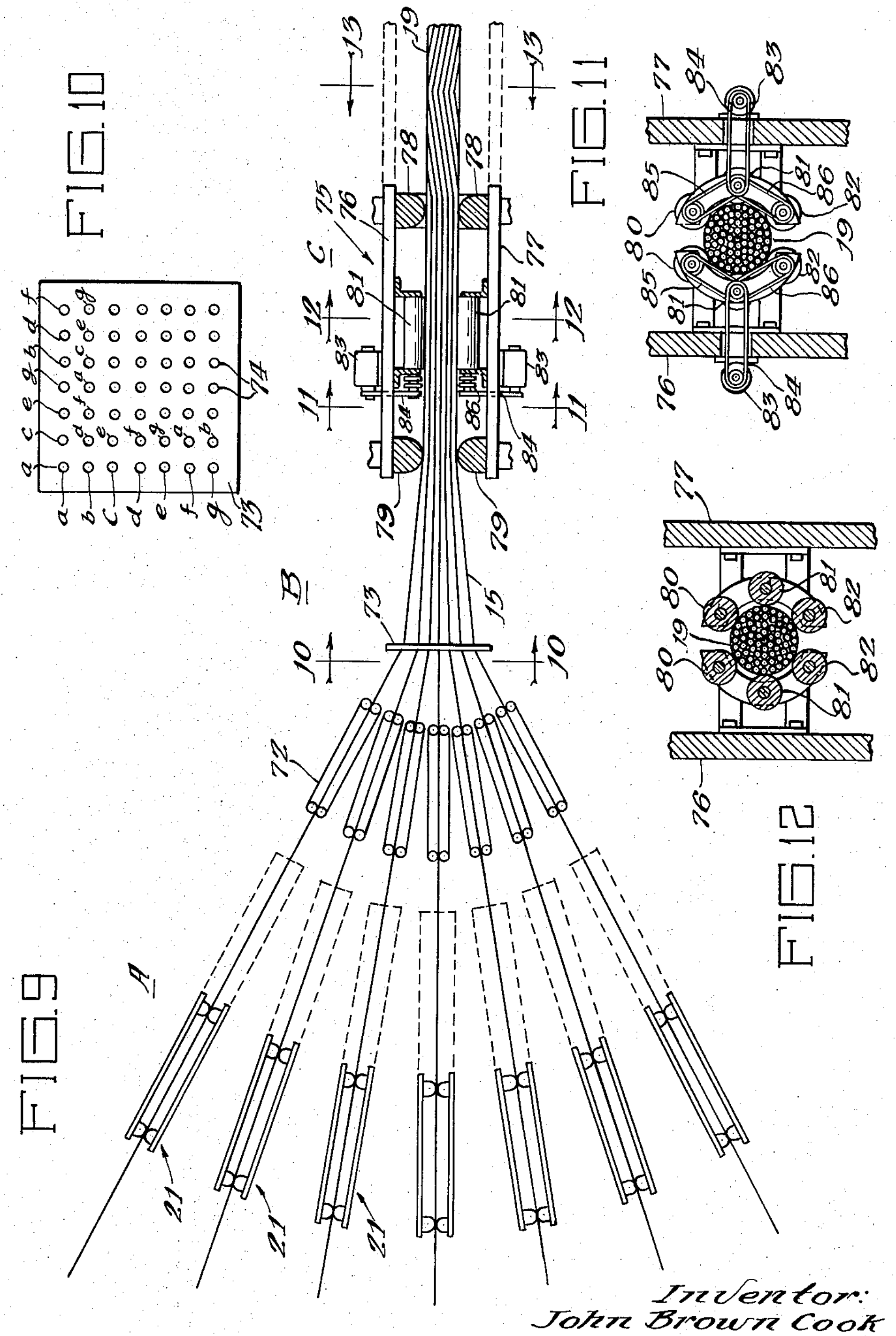
FIG. 9 is a more or less diagrammatic plan view showing a complete installation including the cabling operation.
FIG. 10 is a view in elevation of the pair grouping plate shown in FIG. 9.
Figure 18:
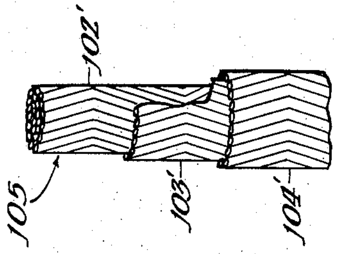
Figure 17:
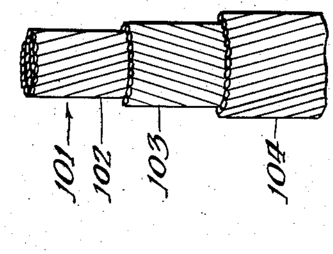
Figure 19:
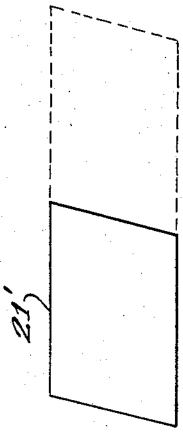
Figure 14:
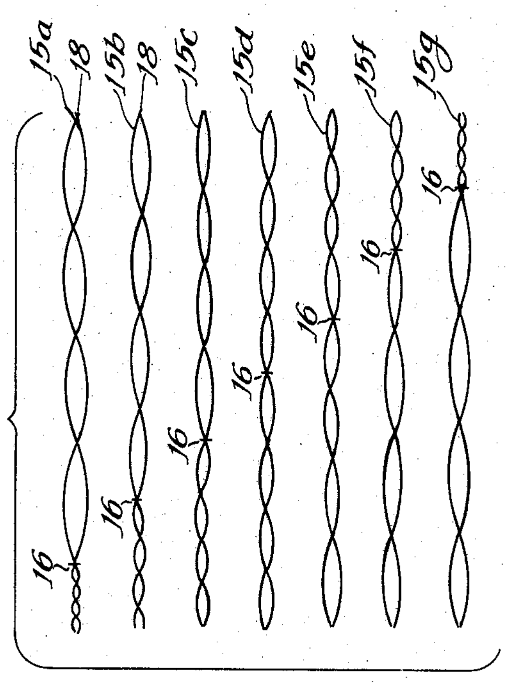
Figure 15:
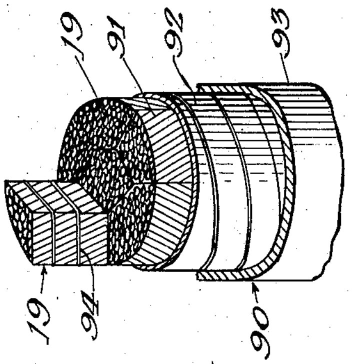
Figure 16:
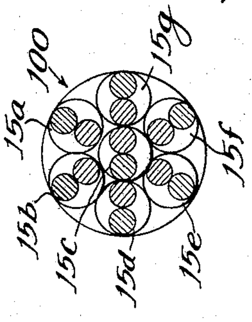
Figure 13:
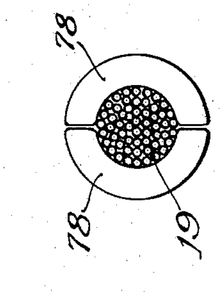

FIG. 11 ils a fragmentary vertical section taken along line 11—11 of FIG. 9;

FIG. 12 is a similar section taken along line 12—12 of FIG. 9;

FIG. 13 is a section taken along line 13—13 of FIG. 9;

FIG. 14 is a diagram showing the variations in pitch resulting from the longitudinal offsetting of the several twisting means;

FIG. 15 is a view of a unit-type cable;

FIG. 16 is a diagrammatic representation of a sub-unit;

FIG. 17 is a view of a layer-type core embodying my invention, but having a conventional or uni-directional twist applied to the separate layers;

FIG. 18 is a view of a similar core, but in which the layers have a zigzag twist; and FIG. 19 is a diagrammatic representation of a modified form of twisting head and frame member.

Figures 1, 2, 3:
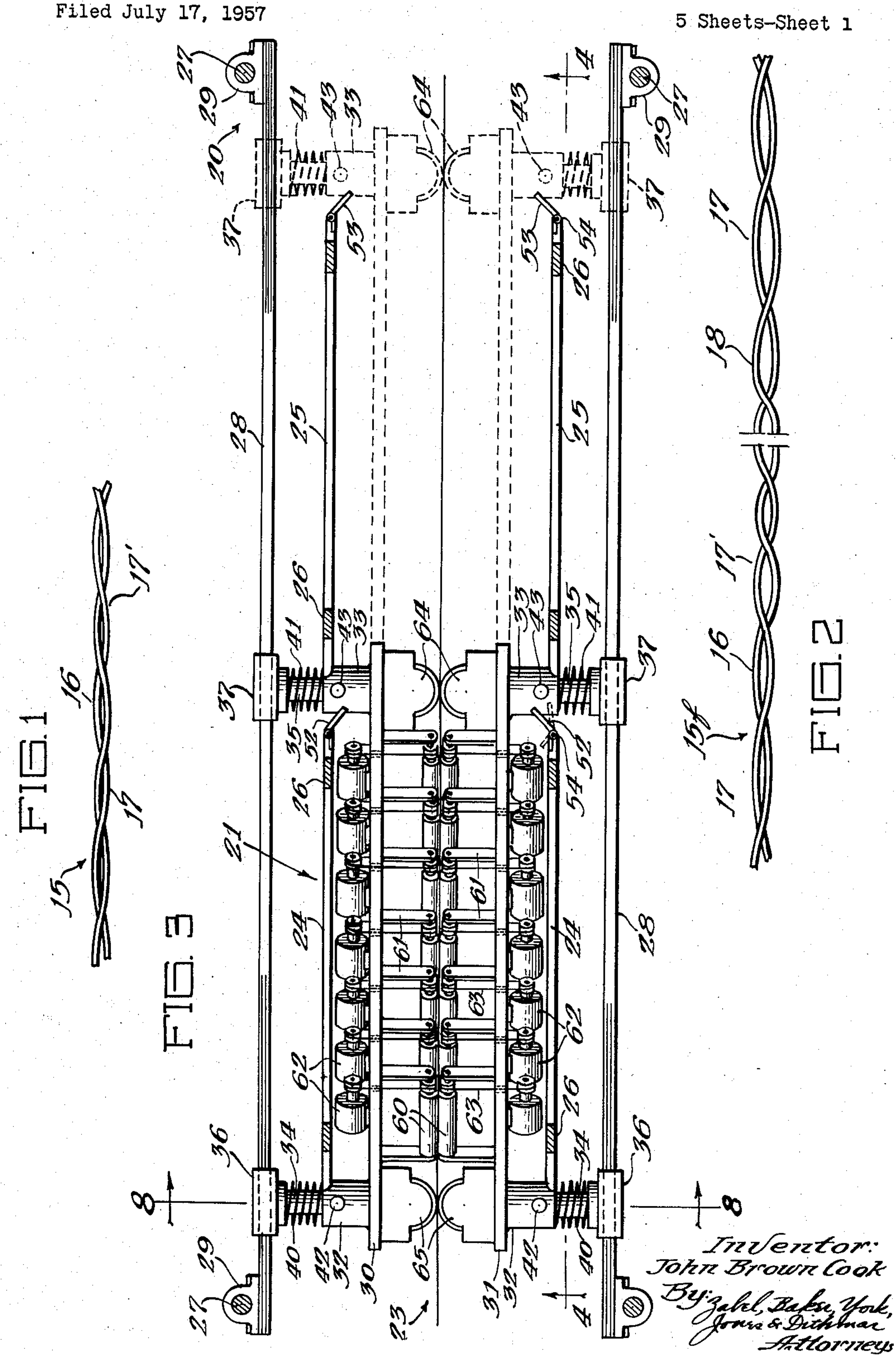
FIG. 1 is a view of a wire pair embodying my invention, and illustrating the zigzag twist.
FIG. 2 is a similar view of a wire pair illustrating a different type of zigzag twist.
FIG. 3 is a plan view of an apparatus, embodying my invention, for imparting a zigzag twist to a plurality of wire pairs and showing a changed position of the twisting head in broken lines.

FIG. 1 shows a wire pair 15 to which a zigzag twist has been imparted, the point 16 being the point of reversal of twist. Thus, the portion 17 which is to the left of the point of reversal is provided with a right-hand twist and the portion 17', to the right of the point of reversal, is provided with a left-hand twist.

FIG. 2 shows a wire pair 15*f* to which a zigzag twist has been imparted, point 16 being the point of reversal and the portions 17 and 17' being provided with right-hand and left-hand twists respectively. In this embodiment the pitch of portion 17 is considerably greater than the pitch of portion 17'. In this wire pair 15*f* there are two points of reversal, the second point of reversal being referred to as the nodal point 18. Thus, to the right of point 18, the portion 17 is substantially identical in direction of twist and in pitch to the portion 17 which lies to the left of the reversal point 16. It is contemplated that this alternate arrangement of portions 17 and 17', which are separated by reversal points 16 and nodal points 18, be repeated indefinitely for a given wire pair.

Thus it will be seen, therefore, that the pitch of portions 17 and 17' of the wire pair 15 differs considerably from the corresponding portions of wire pair 15*f*, with the result that if they are located adjacent to each other, there will be no cross-talk or interference between the two. The cable unit shown in FIG. 16, for example, is made up of a number of different types of wire pairs which are indicated by reference numerals 15*a* to 15*g*, and in which the pitch of the portions 17 and 17' of adjacent wire pairs varies in such a manner as to eliminate interference.

With reference now to FIGS. 3 to 8, the apparatus for imparting a number of different zigzag twists to a number of different wire pairs or other conductor units, such as triplets or quads, comprises support means 20, and twisting head 21, actuating means 22 for reciprocating the twisting head, and pay-out means 23 for feeding the separate wire pairs to the twisting head.

The support means includes two pairs of corner posts 27, to each pair of which is secured a horizontal supporting rail 28 by means of suitable brackets 29. The support means also includes guide rails 24 and 25 which are suspended by brackets 26 from a suitable superstructure.

The twisting head comprises two oppositely disposed frame members 30 and 31 which are of substantially identical construction with the result that the same reference numerals are employed for the corresponding parts of each. Each frame member is in the form of a plate which is provided at the rear and front ends respectively with supporting sleeves 32 and 33. Support pins 34 and 35 are received within the supporting sleeves for axial movement and carry at their outer ends shoes 36 and 37 respectively which fit over and slidably engage the horizontal supporting rails 28. Thus, each frame member 30 and 31 is mounted for longitudinal sliding movement between the rearward position shown in the solid lines and the forward position shown in the broken lines in FIGS. 3 and 4.

Furthermore, the cooperation between the support pins and the supporting sleeves permits each frame to move inwardly and outwardly between the operative position shown in FIG. 3 in which the two frame members engage each other, and a retracted position. Springs 40 and 41 surround the support pins 34 and 35 respectively and thus urge the frame members into their operative position. The supporting sleeves 32 and 33 are provided with upstanding pins 42 and 43 which at certain times engage the guide rails 24 and 25 in order to maintain the frame members in their retracted position.

Figures 4, 5, 6:
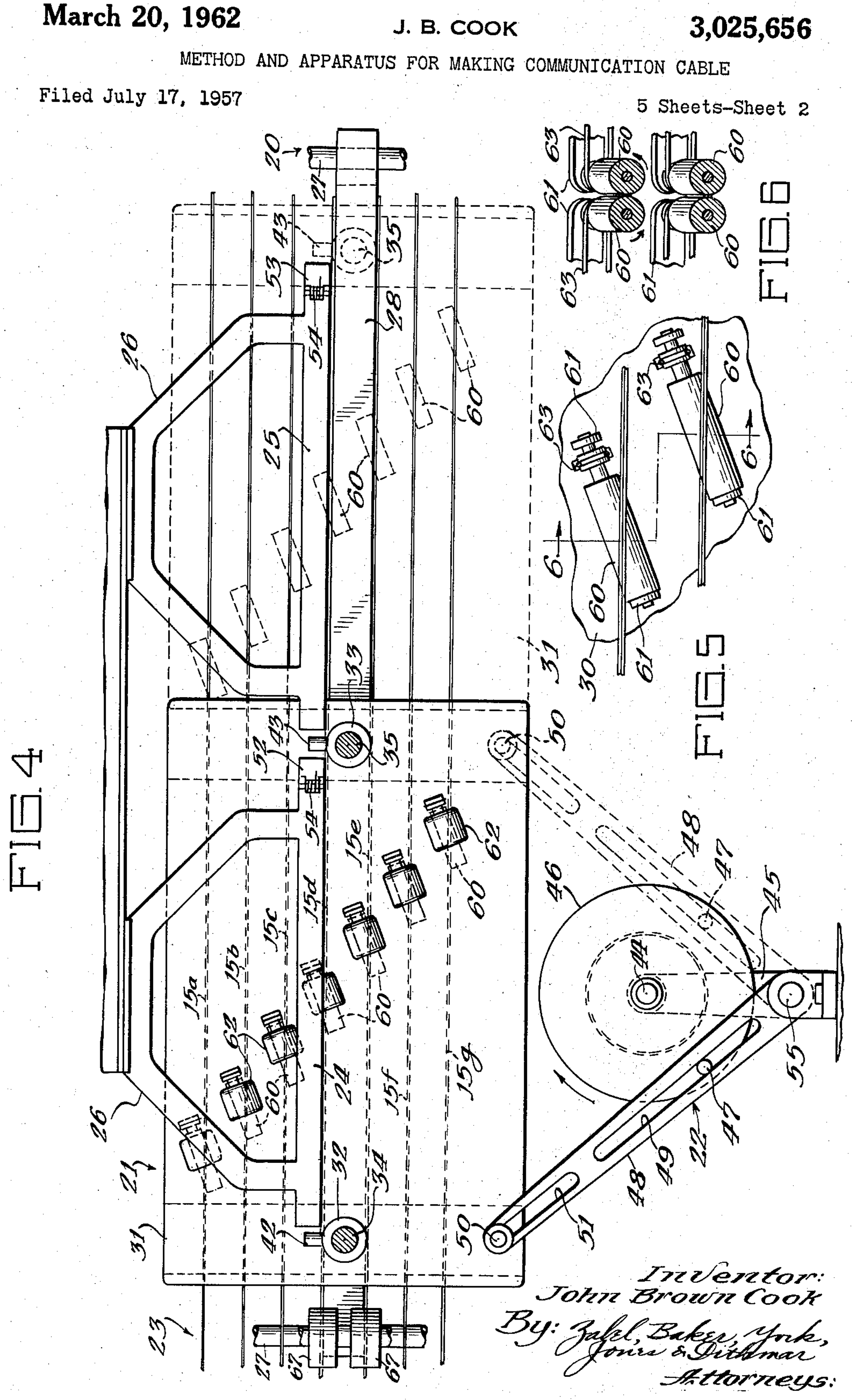
FIG. 4 is an elevation of the apparatus shown in FIG. 3 taken substantially along line 4—4 of FIG. 3.
FIG. 5 is a detailed elevation of two of the twisting rollers shown in FIG. 3.
FIG. 6 is a section taken along lines 6—6 of FIG. 5.
Figure 8:
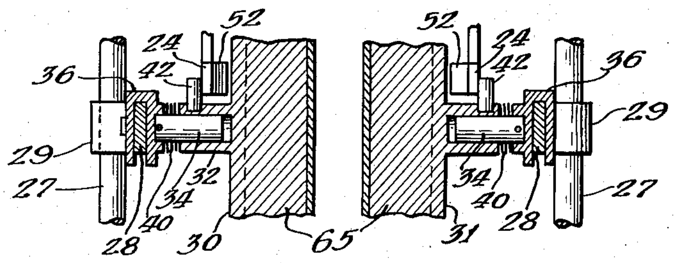
FIG. 8 is a transverse vertical section taken along line 8—8 of FIG. 3.
Figure 7:
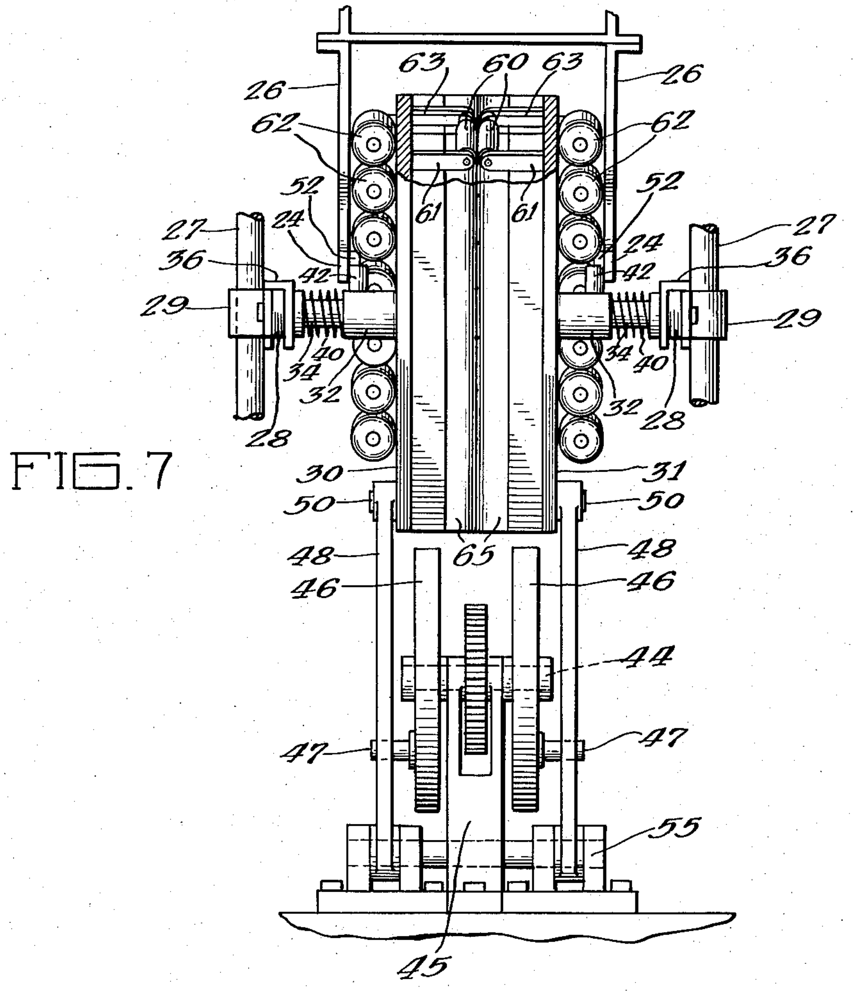
FIG. 7 is an end view of the apparatus shown in FIG. 3.

The actuating means 22 for reciprocating the frame members comprises a shaft 44 shown in FIGS. 4, and 7, which is journaled in a suitable mounting bracket 45. Two wheels 46 are fixed to the shaft, each wheel having an outwardly extending pin 47. Arms 48, pivoted at 55, are each provided with a lower slot 49 to receive the pins 47. Each frame member 30 and 31 is provided with a pin 50 which is received in an upper slot 51 in each arm 48. Thus, as wheels 46 rotate, the arms 48 will oscillate between the rearward position shown in the solid lines in FIG. 4 and the forward position shown in the broken lines and will drive the two frame members 30 and 31 between the corresponding positions. One or both of the wheels 46 may be provided with gear teeth so that they may be driven by a suitable motor and pinion not shown.

In order to impart the in-and-out movement to the frame members, cam flaps 52 and 53 are mounted at the forward end of each of the guide rails 24 and 25. The cam flaps are biased inwardly as shown in FIG. 3, by suitable springs 54 shown in FIG. 4. Thus, as the frame member 30 moves into its forward position, the pins 42 and 43 will snap under the cam flaps 52 and 53 respectively, during the forward movement. However, when the frame begins its rearward movement, the pins 42 and 43 will ride up the cam flaps 52 and 53 onto the guide rails 24 and 25 respectively, with the result that during the rearward movement of the frame members 30 and 31, they are in their retracted position. During their forward movement, however, they are urged into engagement with each other by compression springs 40 and 41 which are mounted at either end of each frame member.

The twisting head 21 is provided with separate means for twisting each of the wire pairs 15*a* to 15*g* in order to impart the zigzag twist. The twisting means comprises a plurality of pairs of rollers 60, one pair of rollers for each wire pair as shown in FIGS. 3 and 4. One roller of each pair is mounted on each of the two frame members 30 and 31 by means of suitable brackets 61.

A separate motor 62 is provided for each roller 60 the motor being mounted on the outer surface of the frame member 30 and the drive being effected by a suitable belt 63. As shown in FIG. 6, the two rollers of each pair are driven in the same direction of rotation to the end that their opposed surfaces will be moving in the opposite directions. When the frame members are in their operative position there is a slight clearance between the rollers of each pair, which clearance is approximately equal to the diameter of the wire pair. Thus, the wire pair is engaged by the rollers and twisted by the same. The rollers are preferably made of a resilient material such as rubber or rubber compound, and may be provided with a surface coating which has a high coefficient of friction with respect to the insulation material with which the wires are coated.

The frame members 30 and 31 are each provided with front and rear work engaging members 64 and 65 respectively which resiliently engage each of the wire pairs to prevent the same from twisting at that point. Thus, the points at which the wire pair 15 is engaged by the members 64 and 65 form the nodal points 18, shown in FIG. 2. The point at which each span is engaged by the twisting rollers 60 forms the reversal point 16. The work engaging members are preferably rounded as shown and formed of somewhat resilient material so as to afford a good grip on the wire pairs without damaging the insulation thereof.

The pay-out means 23 comprises a pair of feeding rollers 67 for each wire pair, together with suitable reel mounting not shown. In the alternative, the wire may be fed directly from a wire-insulating machine by means of the feeding rollers 67.

The twisting rollers 60 are mounted at different positions with respect to the length of the span of the wire pair, to the end that the reversal point of each wire pair will be different from each of the others, thus providing seven different types of zigzag twist in the embodiment shown.

The location of a given pair of twisting rollers 60 also determines the pitch of the two portions 17 and 17'. Assuming that all of the roller pairs are driven at a uniform speed, and further assuming that there is no slippage between the rollers and the wire pairs, then each span will be twisted the same number of times, say for example, 4 times. If the length of the frame, between the work engaging members 64 and 65, is 48 inches, and the twisting roller pair 60 are equidistantly spaced with respect to each other and with respect to the work engaging means, it will be seen from FIG. 14 that in the case of wire pair 15*a* the pitch of portion 17 will be 1½ inches, whereas the pitch of portion 17' will be 10½ inches. With respect to wire pair 15*b*, the respective pitches will be 3 inches and 9 inches and so on. In the case of wire pair 15*d*, the pitch of both portions will be equal as shown in FIG. 1. Thus, it will be seen that seven different types of zigzag twist are provided in which, except for the nodal points, there is no portion 17 which has the same pitch as any other portion 17, and there is no portion of any span which has both the same pitch and the same direction of twist as the correspondingly located portion of any other span.

In order to maintain operative engagement between a given roller pair 60 and its wire pair 15, the axis of rollers is slightly inclined as shown in FIG. 5. This also provides engagement even though there is a variation in elevation of the engaged portion of the span due to sagging or the like.

In operation, the twisting occurs during the forward movement of the twisting head, and the pay-out means 23 feeds the several wire pairs at a speed which corresponds with the rate of forward movement of the twisting head 21. Thus, when the twisting head is in its forward position, there will be an unsupported and untwisted span of wire extending from the rear work engaging members 65 back to the feeding rollers 67. Then, on the rearward movement of the twisting head, the twisted span is released by the separation of the frame members, and when the twisting head arrives at its rearward position, the untwisted span is engaged by the work engaging members 64 and 65 so that the twisting thereof can commence.

Due to the characteristics of the metal wire, once a span has been twisted, it will remain twisted after it has been released by the twisting head and as it moves on to the next operation.

The particular actuating means 22 which is shown herein provides for a rearward movement which is more rapid than the forward movement. For the purpose of clarity, the twisting head has been shown in such a manner that the location of the rear work engaging members 65, when in the forward position, is identical to the location of the front work engaging members in the rearward position; in other words, the motion of the twisting head coincides with the length of the span. In order to avoid a nodal point of substantial length, it is desirable to actuate the feeding rollers intermittently so that the wire pairs will not be paid out during the rearward movement. However, it will be understood that continuous operation can be attained by reducing the extent of the forward and backward movement of the twisting head with respect to its length so that when in its rearward position, as the frame members move inwardly, they will grip the wire pairs at the exact nodal point.

A complete installation for continuously fabricating a cable unit is shown more or less diagrammatically in FIG. 9 in which A designates the pair twisting station, B the pair grouping station, and C the cabling station. The pair twisting station comprises a plurality of twisting heads 21 arranged more or less radially so that the plurality of twisted pairs of each are fed to the pair grouping station which comprises a plate 73 having a plurality of apertures 74, one for each twisted pair. Feeding belts 72 may be provided between the twisting heads 21 and the plate 73 in order to support the pairs since they are moved forward at only very light tensions to avoid untwisting.

From the grouping plate 73, the wire pairs 15 are fed to a unit twisting head 75 which is generally similar in operation to twisting head 21, and in which the support means and actuating means are not shown in view of their substantial identity to assemblies 20 and 22 which have previously been described.

The unit twisting head 75 comprises oppositely disposed reciprocating frame members 76 and 77, each of which is provided with a shaped front work engaging member 78 and a shaped rear work engaging member 79. The grouping plate 73 can group the pairs of a cable unit into any convenient configuration, either rectangular as shown or circular, and the work engaging members are desirably of semi-circular shape as shown in FIG. 13, so that the group may be further reduced to a circular cross-section which is adapted for twisting.

Twisting may be effected by a group of six twisting rollers which entirely surround the group or unit, three twisting rollers 80, 81 and 82 being suitably mounted on each of the frame members 76 and 77. Each set of rollers is driven by a motor 83, by means of a belt 84 which extends to the middle twisting roller 81. Belts 85 and 86 are provided to drive the adjacent rollers 80 and 82 respectively. The rollers are all driven in the same direction of rotation, and due to the configuration of the unit and of the roller centers, it is not necessary to incline the roller axes as in the case of a wire pair twisting unit 21.

In other respects the unit twisting head 75 operates in the same manner as the pair twisting heads 21 to impart a zigzag twist to the cable unit 19, thus providing greater flexibility in handling and also facilitating individual splicing operations. The principal advantage, however, of imparting a zigzag twist to the cable unit is that the fabrication can take place continuously from the separate wire reels or insulating machines instead of reeling up each group of wire pairs as is necessary when a conventional cabling operation is employed.

The cable units 19 may then be secured to each other by a spiral binding thread 94, and then the separate cable units compressed and assembled into a unit-type core as shown in FIG. 15, having either a uni-directional twist or a zigzag twist. The core is then wrapped and sheathed in order to form a complete cable 90. If the units are assembled with a zigzag twist, the fabrication of the complete cable may be effected continuously.

The complete cable 90 is shown in FIG. 15 and comprises a core 91, and wrapping 92, and suitable sheathing 93. The core is made up of a plurality of cable units 19 as above described.

My invention may also be utilized in the fabrication of a layer-type core rather than the unit-type core 91 which is shown in FIG. 15. The layer-type core may be laid up either from the individual wire pairs or other conductor units 15, or from sub-units 100 as shown in FIG. 16. Each sub-unit comprises a plurality of zigzag twisted wire pairs 15, such as 15*a* to 15*g*, which in turn are zigzag twisted together to form a sub-unit 100. A suitable binding thread may be applied to facilitate handling, and the sub-units may either be reeled up for a subsequent cabling operation, or may be fed continuously to a twisting head of the zigzag type.

FIG. 17 shows a layer-type core 101 of which layers 102, 103 and 104 are shown, each being provided with a unidirectional twist but in opposite directions, and the layers each being formed of individual wire pairs 15 or of sub-units 100, as above described.

FIG. 18 shows a layer-type core 105 in which the separate layers 102′, 103′, and 104′ are provided with zigzag twists. These may either be of the same pitch with the nodal points of alternate layers exactly offset from each other so that they are opposite the reversal points of adjacent layers, or they may be formed with variable pitches as described above in connection with the zigzag twist of the wire pairs. Also, the length of the spans or distance between the nodal points may be varied from one layer to the other.

In the sub-unit type of construction, the nodal points of all wire pairs in a given sub-unit will be the same but it is desirable to so position the various twisting heads that these nodal points are offset one from the other as the separate sub-units are fed into the cabling machine. Similarly, in the installation shown in FIG. 9, the nodal points of the different groups of wire pairs may be offset from one another.

In any grouping or cabling operation, the nodal points of the sub-unit or of the cable unit may be offset from the nodal points of the twisted pairs, or the respective spans may be of different lengths in order to secure such offset.

Where it is desired to secure offsetting of the nodal points 18 of the various types of twisted pairs 15*a* to 15*g* in a given set, a parallelogram type of twisting frame 21′ may be utilized as diagrammatically shown in FIG. 19 to achieve such offsetting.

In the pair grouping operation shown in FIG. 9, it may be desired to vary the arrangement of the pairs of twisting rollers 60 from one twisting head 21 to the other so as to obtain a wire grouping as illustrated by the arrangement of the seven groups of letters *a* to *g*, shown in FIG. 10, each letter indicating a different type of zigzag twist as previously described.

The operation of the apparatus has been described in detail in connection with the description of the several parts and sub-assemblies thereof. By providing a set of twisted pairs, of which each member of the set has a different type of zigzag twist, it is possible to group the individual wire pairs either into cable units in the case of a unit-type core or into sub-units in the case of a layer-type core, in such a manner that the pitch of any given portion of a given pair will be different from the pitch of the corresponding portion of an adjacent pair, thus eliminating electrical interference.

Furthermore, my improved method of imparting a zigzag twist to wire pairs permits the twisting operation to be combined with subsequent grouping and cabling operations to provide a continuous unit or cable fabricating process.

The zigzag twist also provides an improved method of grouping a plurality of conductors or conductor units into a cable unit or into any other unit which requires further handling, such as that incident to a subsequent cabling operation, irrespective of whether the separate conductor units are twisted or not. This is for the reason that the zigzag twist in itself is effective to prevent separation of the separate conductor units, but it provides much greater flexibility than a unidirectional twist because the outer strands of any curve can readily be lengthened by very slight tension. Thus such a cable unit is much more adaptable to a second cabling operation of tight twist, either zigzag or unidirectional, than is an untwisted or an unidirectionally twisted cable unit.

Although only certain preferred embodiments of my invention have been shown and described herein, it will be apparent that various modifications and changes may be made in the steps and in the apparatus shown and described herein without departing from the spirit of my invention as pointed out in the appended claims.

I claim:

1. The method of making a conductor unit having a zigzag twist comprising the steps of paying out a conductor unit, gripping both ends of a given span thereof, and twisting said span at an intermediate point thereof to provide a zigzag twist within said span, and repeating said operation on contiguous spans to form a continuous zigzag twist.

2. The method of making a plurality of conductor units having a zigzag twist comprising the steps of arranging a plurality of conductor units in spaced arrangement, gripping both ends of correspondingly located given spans of each, and twisting each span at an intermediate point thereof to provide a zigzag twist within each span, said intermediate twisting points being longitudinally offset from one span to another in order to provide a different pitch of twist in corresponding portions of adjacent spans.

3. The method of making a plurality of conductor units having a zigzag twist comprising the steps of paying out a plurality of conductor units in spaced co-planar arrangement, gripping both ends of correspondingly located given spans of each, and twisting each span at an intermediate point thereof to provide a zigzag twist within each span, said intermediate twisting points being longitudinally offset from one span to another in order to provide a different pitch of twist in corresponding portions of adjacent spans.

4. The method of making a plurality of conductor units having a zigzag twist comprising the steps of paying out a plurality of conductor units in spaced co-planar arrangement, gripping both ends of correspondingly located given spans of each, and twisting each span at an intermediate point thereof to provide a point of pitch reversal within each span, said pitch reversal points being longitudinally offset from one span to another in order to provide a different pitch of twist in corresponding portions of adjacent spans, and said separate spans being longitudinally offset from each other to provide an offsetting of the nodal points of the separate conductor units.

5. The method of making a plurality of conductor units having a zigzag twist comprising the steps of paying out a plurality of conductor units in spaced co-planar arrangement, gripping both ends of correspondingly located given spans of each, and twisting each span at an intermediate point thereof to provide a zigzag twist within each span, said intermediate twisting points being longitudinally offset from one span to another in order to provide a different pitch of twist in corresponding portions of adjacent spans, and repeating said operation on contiguous spans of each conductor unit to form a continuous zigzag twist in each.

6. The method of fabricating a non-interference cable from a plurality of conductors comprising the steps of dividing the conductor units into sets, imparting to each member of the set a zigzag twist with respect to uniformly spaced nodal points such that the pitch of corresponding portions of each member of the set is different from the other, grouping a plurality of such sets by arranging the members of each set with respect to the members of its adjacent sets so that the corresponding portions of adjacent members of different sets will have different pitches, and cabling the grouped sets to form a cable unit.

7. The method of fabricating a non-interference communication cable from a plurality of conductor units comprising the steps of dividing the conductor units into sets, imparting to each member of the set a zigzag twist with respect to uniformly spaced nodal points such that the pitch of corresponding portions of each member of the set is different from the other, grouping a plurality of such sets into a cable unit by arranging the members of each set with respect to the members of its adjacent sets so that the corresponding portions of adjacent members of different sets will have different pitches, and cabling a plurality of such cable units into a unit-type core.

8. The method of fabricating a non-interference communication cable from a plurality of conductor units comprising the steps of dividing the conductor units into sets, imparting to each member of the set a zigzag twist with respect to uniformly spaced nodal points such that the pitch of corresponding portions of each member of the set is different from the other, grouping each set into a sub-unit, and cabling said sub-units into a layer-type core.

9. The method of fabricating a non-interference cable from a plurality of conductors comprising the steps of dividing the conductor units into sets, imparting to each member of the set a zigzag twist such that the pitch of corresponding portions of each member of the set is different from the other, grouping each set into a sub-unit, imparting a zigzag twist to said sub-units, and cabling said sub-units into a layer-type core.

10. The method of fabricating a non-interference cable from a plurality of conductor units comprising the steps of dividing the conductor units into sets, imparting to each member of the set a zigzag twist such that the pitch of corresponding portions of each member of the set is different from the other, grouping each set into a sub-unit, arranging said sub-units in concentric circular layers, and imparting a zigzag twist to each layer such that the nodal points of the zigzag twist of one layer are longitudinally offset from the nodal points of the zigzag twist of both adjacent layers.

11. Twisting mechanism for simultaneously twisting a plurality of conductor groups comprising support means including a pair of horizontally disposed supporting rails, a twisting head slidably mounted on said supporting rails, and actuating means to reciprocate longitudinally said twisting head between a forward and a rearward position, said twisting head comprising a pair of oppositely disposed frame members, work engaging means for each conductor group disposed at the front and rear ends of said frame members, twisting means located intermediate said ends, one for each conductor group, said twisting means being longitudinally offset one from the other, and means for causing said frame members to move laterally in a direction transverse to the longitudinal reciprocating movement of the twisting head as a whole between an operative position during forward longitudinal movement of said frame members and a retracted position during rearward longitudinal movement thereof, whereby said work engaging means will grip a span of each conductor group during the forward movement of said twisting head and said twisting means will impart a zigzag twist to each span, and whereby said twisted span will be released during rearward movement of said twisting head.

12. Twisting mechanism as claimed in claim 11 in which said front work engaging means are offset from each other in a longitudinal direction and in which said rear work engaging means are similarly offset from each other in the longitudinal direction so that the spans gripped by each pair of front and rear work engaging members will be of equal length but longitudinally offset one from the other.

13. Twisting mechanism for simultaneously twisting a plurality of conductor groups comprising support means including a pair of horizontally disposed supporting rails, guide rail means disposed parallel to said supporting rails, a twisting head slidably mounted on said supporting rails, and actuating means to reciprocate said twisting head between a forward and a rearward position, said twisting head comprising a pair of oppositely disposed frame members, conductor group engaging means disposed at the front and rear ends of said frame members for maintaining the nodal points of a conductor group in an untwisted condition, conductor group twisting means located intermediate said ends, one for each conductor group, and means including said guide rail means and a follower carried by each frame member for engaging said guide rail means during its reciprocating movement in one direction for causing said frame members to move laterally between an operative position during forward movement of said frame members and a retracted position during rearward movement thereof whereby said twisting head will grip a span of each conductor group during the forward movement of said twisting head and will impart a zigzag twist thereto, and whereby said twisted span will be released during rearward movement of said twisting head.

14. In a wire twisting or cabling machine, a twisting head comprising a pair of oppositely disposed frame members, work engaging means disposed at the front and rear ends of said frame members, twisting means located intermediate said ends, and means for causing said frame members to move laterally between an operative position and a retracted position whereby a span of a grouped wire or cable assembly comprising a plurality of parallel elements will be gripped at both ends by said work engaging means and engaged at an intermediate point by said twisting means to impart a zigzag twist to said span.

15. A twisting head as claimed in claim 14 in which said twisting means comprises a pair of oppositely disposed rollers for engaging and twisting said span, means for mounting one of said rollers on one of said frame members and the other roller on the other frame member, and separate means for driving each of said rollers in the same direction of rotation.

16. A twisting head as claimed in claim 15 in which the axes of said rollers are parallel to each other and inclined to the direction of orientation of said span at the point of engagement.

17. A twisting head as claimed in claim 14, in which said twisting means comprises a plurality of rollers arranged to surround said span, said plurality of rollers comprising two sets of rollers, one set being mounted on each frame member, the axes of said rollers being substantially parallel to the axis of said span, and means for driving said rollers in the same direction of rotation.

18. The method of intertwisting a plurality of advancing strands against twisting at spaced points therethe advancing strands against twisting at spaced points therealong, advancing the gripping points with the strands, and intertwisting the strands in the spans extending between the gripping points during the advancement of the gripping points with the strands.

19. Apparatus of intertwisting a plurality of advancing strands, which comprises means for gripping the advancing strands, which comprises the steps of gripping along, means for advancing said gripping means with the strands, and means for intertwisting the strands in the spans extending between said gripping means during the advancement of said gripping means with the strands.

References Cited in the file of this patent

UNITED STATES PATENTS

| | | |
|---|---|---|
| 278,289 | Strohm | May 22, 1883 |
| 491,109 | Holman | Feb. 7, 1893 |
| 1,030,426 | Parsons et al. | June 25, 1912 |
| 1,422,073 | Anderson | July 11, 1922 |
| 1,862,345 | Wolf | June 7, 1932 |
| 1,960,426 | Zundorf | May 29, 1934 |
| 2,001,065 | Klein | May 14, 1935 |
| 2,296,918 | Gibson | Sept. 29, 1942 |
| 2,442,761 | Drennen | June 8, 1948 |
| 2,790,299 | Gillis et al. | Apr. 30, 1957 |
| 2,869,316 | Lilly | Jan. 20, 1959 |
| 2,882,676 | Bryan et al. | Apr. 21, 1959 |

UNITED STATES PATENT OFFICE

CERTIFICATE OF CORRECTION

Patent No. 3,025,656 March 20, 1962

John Brown Cook

It is hereby certified that error appears in the above numbered patent requiring correction and that the said Letters Patent should read as corrected below.

Column 10, line 20, for "against twisting at spaced points there-" read -- , which comprises the steps of gripping --; line 28, for ", which comprises the steps of gripping" read -- against twisting at spaced points there- --; line 26, for "of", first occurrence, read -- for --.

Signed and sealed this 3rd day of July 1962.

(SEAL)
Attest:

ERNEST W. SWIDER
Attesting Officer

DAVID L. LADD
Commissioner of Patents